(12) United States Patent
Ovadia

(10) Patent No.: US 12,460,669 B2
(45) Date of Patent: Nov. 4, 2025

(54) MOUNTING DEVICE TO SECURELY HANG A WIDE RANGE OF OBJECTS TO A WALL

(71) Applicant: JTLE INVESTMENTS LLC, Hallandale Beach, FL (US)

(72) Inventor: Joseph Ovadia, Hallandale Beach, FL (US)

( * ) Notice: Subject to any disclaimer, the term of this patent is extended or adjusted under 35 U.S.C. 154(b) by 0 days.

(21) Appl. No.: 18/335,948

(22) Filed: Jun. 15, 2023

(65) Prior Publication Data
US 2024/0133420 A1 Apr. 25, 2024
US 2024/0229857 A9 Jul. 11, 2024

Related U.S. Application Data

(60) Provisional application No. 63/417,918, filed on Oct. 20, 2022.

(51) Int. Cl.
*F16B 45/00* (2006.01)

(52) U.S. Cl.
CPC .................................. *F16B 45/008* (2021.05)

(58) Field of Classification Search
CPC ............................... F16B 45/00; F16B 45/008
See application file for complete search history.

(56) References Cited

U.S. PATENT DOCUMENTS 2,049,716 A * 8/1936 Owen ...................... A47G 1/20
248/549
4,094,490 A * 6/1978 Einhorn .................... A47G 1/20
411/443
4,795,294 A * 1/1989 Takada ..................... A47G 1/22
248/547

(Continued)

FOREIGN PATENT DOCUMENTS

JP 2005510270 A * 4/2005 ............... A47G 1/20

OTHER PUBLICATIONS

MiTek slant nail face mount joist hanger JUS28 online product page, web.archive.org dated: Jul. 4, 2022, https://www.mitek-us.com/products/solid-sawn-hangers/face-mount-hangers/hus/ (Year: 2022).*

(Continued)

*Primary Examiner* — Terrell L Mckinnon
*Assistant Examiner* — Ding Y Tan
(74) *Attorney, Agent, or Firm* — Saul Ewing LLP; Brian R. Landry

(57) ABSTRACT

The present invention relates to a mounting device to securely hang objects to the wall. The mounting device has a support member and a hook portion. The support member has a plurality of nipple members through which a plurality of nail members can be driven into the wall. The nipple members are positioned on an angle to support and offset the weight of heavier objects. The support member also has apertures in a "V-shaped" configuration. The user can hammer larger screws through the apertures for securing the support member onto denser walls. The mounting device also has a hang member. The hang member has smaller apertures and a large opening. The smaller apertures are used to secure the hang member onto the object to be hung itself. The large opening couples the hang member to the hook portion, allowing the mounting device to securely hang the object to the wall.

12 Claims, 12 Drawing Sheets

(56) References Cited

U.S. PATENT DOCUMENTS

| | | | | |
|---|---|---|---|---|
| 5,018,697 A * | 5/1991 | Treanor | | A47G 1/20 248/489 |
| 5,071,280 A * | 12/1991 | Turner | | F16B 9/058 403/283 |
| 5,709,059 A * | 1/1998 | Murphy | | F16B 43/00 411/480 |
| 6,095,465 A * | 8/2000 | Weck | | A47G 1/20 248/467 |
| 6,578,341 B2 * | 6/2003 | Hoffmann | | E04B 1/2604 52/703 |
| 6,758,455 B2 * | 7/2004 | Weck | | A47G 1/20 248/176.1 |
| D559,091 S * | 1/2008 | Skorka | | D8/367 |
| 8,347,582 B1 * | 1/2013 | Thompson | | E04B 1/2608 52/712 |
| 9,075,290 B1 * | 7/2015 | Thieman | | F16M 13/022 |
| D773,288 S * | 12/2016 | Green | | D8/372 |
| 9,687,092 B2 * | 6/2017 | Cabanes | | A47G 1/1606 |
| 9,920,514 B1 * | 3/2018 | Brekke | | E04B 7/022 |
| D887,255 S * | 6/2020 | Ovadia | | D8/367 |
| 10,724,678 B1 * | 7/2020 | Elliott | | F16M 13/02 |
| 11,111,942 B2 * | 9/2021 | Cogburn | | F16B 43/02 |
| 11,193,268 B2 * | 12/2021 | Sasanecki | | E04B 1/2612 |
| 11,234,539 B2 * | 2/2022 | Black | | A47G 1/164 |
| 11,432,664 B2 * | 9/2022 | McDaniel | | A47G 1/205 |
| 11,547,223 B1 * | 1/2023 | Hassett | | A47G 1/17 |
| 11,690,467 B2 * | 7/2023 | Hanley | | F16B 45/015 248/262 |
| 2003/0085331 A1 * | 5/2003 | Weck | | A47G 1/20 248/475.1 |
| 2007/0295879 A1 * | 12/2007 | Wong | | A47G 1/20 248/475.1 |
| 2010/0213333 A1 * | 8/2010 | Mejia | | A47G 1/22 248/220.21 |
| 2010/0294910 A1 * | 11/2010 | Grant Orsini | | F16B 45/008 248/475.1 |
| 2011/0085874 A1 * | 4/2011 | Davidowitch | | A47G 1/22 411/82.1 |
| 2014/0326848 A1 * | 11/2014 | Popkin | | A47G 1/162 248/475.1 |
| 2018/0073549 A1 * | 3/2018 | Cogburn | | F16M 13/02 |

OTHER PUBLICATIONS

Crochet X Terbb2 nylon picture hook sold on amazon, first available date: Oct. 10, 2013, https://www.amazon.com/Crochet-TERB2-Picture-Specially-Concrete/dp/B00FDS9EOC (Year: 2013).*

Netlkla stainless steel metal hooks for hanging, first available date Dec. 10, 2020 https://www.amazon.com/NETNETMALL-Stainless-Bathroom-Kitchen-Mounted/dp/B08PKFMTP8 (Year: 2020).*

Picture Hang Solutions heavy duty D-ring picture hangers with screws sold on amazon.com, first available date: Oct. 30, 2015, https://www.amazon.com/Heavy-Duty-D-Ring-Picture-Hangers/dp/B017DQ9GC6 (Year: 2015).*

* cited by examiner

PROVIDING A MOUNTING DEVICE COMPRISING A SUPPORT MEMBER WITH A HOOK PORTION AND A HANG MEMBER COMPRISING A HEAD PORTION AND A HANDLE PORTION, THE SUPPORT MEMBER COMPRISES A PLURALITY OF NIPPLE MEMBERS PROVIDED IN CORNERS OF AN UPPER PORTION AND A LOWER PORTION OF THE SUPPORT MEMBER AT AN ANGLED POSITION AND A PLURALITY OF APERTURES PROVIDED IN A CENTER PORTION OF THE SUPPORT MEMBER, THE HEAD PORTION OF THE HANG MEMBER COMPRISES A LARGE OPENING AND THE HANDLE PORTION OF THE HANG MEMBER COMPRISES SMALLER APERTURES
1002

AFFIXING THE OBJECT TO THE HANG MEMBER BY DRIVING SCREWS THROUGH EACH OF THE SMALLER APERTURES DISPOSED ON THE HANDLE PORTION OF THE HANG MEMBER
1008

COUPLING THE HANG MEMBER AFFIXED WITH THE OBJECT WITH THE HOOK PORTION OF THE SUPPORT MEMBER THROUGH THE LARGE OPENING PROVIDED ON THE HEAD PORTION TO SECURELY MOUNT THE OBJECT ON THE WALL
1010

FIG. 10C

MOUNTING DEVICE TO SECURELY HANG A WIDE RANGE OF OBJECTS TO A WALL

CLAIM FOR PRIORITY

This application claims priority from prior utility provisional application with the application No. 63/417,918 filed on Oct. 20, 2022. The entire collective teachings thereof being herein incorporated by reference.

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A SEQUENCE LISTING, A LARGE TABLE, OR A COMPUTER PROGRAM LISTING APPENDIX ON READ-ONLY OPTICAL DISC (IF APPLICABLE)

Not Applicable.

FIELD OF THE INVENTION

This invention generally relates to a hang element for hanging objects and more specifically, a mounting device to securely hang a wide range of objects to a wall easily and effortlessly without the aid of any complex tools or the help of a professional.

BACKGROUND OF THE INVENTION

Conventional wall mounting apparatuses that are directly fixed to a wall surface by a bolt or installed in front of a fixing metal bracket installed on a wall surface to securely hang objects to a wall such as televisions, monitors, or heavy frames are complex and time-consuming. They are riddled with pages and pages upon instructions. The mounting devices in the prior art are limited in what they can support. They consume a lot of time to install. Most of them require complex tools. They also need the expertise of a professional installer. Mounting devices found in the prior art require the support of wall studs due to the object's weight. This limits the location of where objects can be hung.

Additionally, most mounting devices cannot be used on all types of wall surfaces. Further, the fixing mechanism of existing wall mounting devices does not facilitate the user to easily remove the mounting device from the wall. Often, dismantling the mounting device requires professional expertise and the wall is more prone to damage while removing the mounting devices from the wall.

To fulfill this need in the market, one such invention is disclosed in the prior art as a picture hanger (U.S. Pub. No. USD474106S1). This prior art discloses a picture hanger comprising a support member. The support member has nipple members with holes to penetrate the nails angularly (high load capacity) for fitting the support member for penetrating surfaces like dry walls. The support member also consists of apertures for the installation of bolts for fitting to a rigid surface like concrete or cement wall and a hook for the support of the hanging member. However, this prior art fails to disclose the hanging member to connect the support member for connecting the hanging objects via a bolt. As such, this invention in the prior art is severely limited and unable to fulfill all the needs related to a mounting device to securely hang a wide range of objects to a wall easily and effortlessly without the aid of any complex tools or the help of a professional.

There is another invention disclosed in the prior art as a wall hanger device and method for installing a wall hanger device (U.S. Pub. No. US20150108304A1). In one exemplary embodiment, at least a first hanger body has at least a first lower-hanging element. At least a first fastening element is a first needle having at least a head, a shaft, and a point. The shaft has at least a middle portion and a front end. The first hanger body has at least a first bore with cross-sectional dimensions complementary to the middle portion. The first hanger body and the first fastening element is an autonomous assembly made of molded plastic. The shaft is forcibly detachable from the outer end of the first bore when an external force is exerted on the outer face of the head while the back of the hanger body is positioned adjacent to a hanging surface, which then allows the middle portion of the first needle to slideably and frictionally enters the first bore until an under the face of the head is adjacent to a portion of a front of the hanger body, and the point and the front end to puncture, then enter into, the hanging surface. However, this prior art fails to disclose the hanging member to connect the support member for connecting the hanging objects. As such, this invention in the prior art is severely limited and unable to fulfill all the needs related to a mounting device to securely hang a wide range of objects to a wall easily and effortlessly without the aid of any complex tools or the help of a professional.

There is yet another invention disclosed in the prior art as a wall hanger (U.S. Pub. No. US20080251682A1). The prior art provides a fastening element for fastening objects to a wall comprising a body with a substantially flat rear side being adapted to butt against a wall, further comprising at least a first straight shaft penetrating the body at an angle with respect to the plane of the body's rear side, whereby the shaft being adapted to guide a pin-like fastening means to be driven into the wall for affixing the fastening element to the wall, the body further comprising at least one pre-fixing element protruding from the body's rear side and being adapted to penetrate the wall when the body is brought in contact with the wall. However, this prior art fails to disclose the hanging member to connect the support member for connecting the hanging objects. As such, this invention in the prior art is severely limited and unable to fulfill all the needs related to a mounting device to securely hang a wide range of objects to a wall easily and effortlessly without the aid of any complex tools or the help of a professional.

There is yet another invention disclosed in the prior art as a wall hook (U.S. Pub. No. US20180073549A1). A hook system of a unibody structure with three platforms that face an angled hole. The hook system includes nails adapted to be particularly suitable for mounting the hook and platform inserts to receive the nails. However, this prior art fails to disclose the hanging member to connect the support member for connecting the hanging objects. As such, this invention in the prior art is severely limited and unable to fulfill all the needs related to a mounting device to securely hang a wide range of objects to a wall easily and effortlessly without the aid of any complex tools or the help of a professional.

Yet another invention is disclosed in the prior art as a Hanger for an object adapted to be hung on a wall (U.S. Pub. No. US20030085331A1). A picture hanger has a metal base from which is stamped a tongue for receiving a wire of a picture frame hung on a wall. The tongue has a convex shape with respect to the front face of the base and a ledge thereof on which the wire rests bears against a protrusion extending from the base front face. The tongue has bends with progressively increasing angles as it extends away from the base. However, again, this prior art fails to disclose the hanging member to connect the support member for connecting the hanging objects. As such, this invention in the prior art is severely limited and unable to fulfill all the needs related to a mounting device to securely hang a wide range of objects to a wall easily and effortlessly without the aid of any complex tools or the help of a professional.

Accordingly, it is apparent that a need exists for a mounting device that can resolve many of the challenges of the existing wall mounting systems.

BRIEF SUMMARY OF THE INVENTION

The present invention provides a mounting device to securely hang a wide range of objects such as televisions, monitors, mirrors, ornaments, pictures, bookshelves, plants, and bicycles to a wall. The mounting device includes a support member, a hook portion, and a hang member. The support member has a plurality of nipple members.

The plurality of nipple members are structured to allow a plurality of nail members to penetrate through the plurality of nipple members onto the wall at a desired angle. The angled position of each of the nipple members on the support member causes an angular penetration of the nail through the nipple member onto the wall.

The plurality of nail members penetrating the support member at the upper portion through the plurality of nipple members penetrates at a particular angle vertically to secure the support member and the plurality of nail members penetrating the support member at the bottom portion through the plurality of nipple members penetrates horizontally at a side angular orientation to lock the support member in place facilitating the user to remove the object from the wall securely without the support member moving upwards.

The support member has a plurality of apertures. The apertures are oriented in a "V-shaped" orientation on the support member structured to accommodate larger-sized screws. In the V-shaped orientation, the plurality of apertures are positioned in a triangular orientation with each other. The support member holds the hook portion that has an angled edge similar to a fish hook. The edge comprises a barb member. The hook portion includes a flat bottom surface at a portion connecting a first portion and a second portion of the hook portion, the flat bottom surface is configured to accommodate higher weight of the object to be hung. The hook portion does not allow the object to be able to come in and out easily unless the user lifts the object towards themself and pushes toward the hook portion in order to maneuver the object away.

The hang member of the mounting device has an angular orientation. This allows the hang member to affix itself directly to the object to be hung as well as couple the hang member to the hook portion. The user can affix the object to the hang member by driving a screw through each of the smaller apertures disposed on a handle portion of the hang member. In order to affix the hang member to the object, the user drives a screw through at least one of the smaller apertures found on the handle portion of the hang member as well as the aperture found on the object. This allows for the coupling of the hang member to the object itself.

A large opening disposed on a head portion of the hang member couples with the hook portion when the user latches the large opening of the hang member onto the hook portion. By connecting the large opening of the hang member to the hook portion, the user effectively secures and hangs the object to the wall.

The mounting device of the present invention allows any user to install and secure a wide range of objects to the wall easily and effortlessly without the aid of any complex tools or the help of a professional.

The mounting device is capable of effortlessly installing and securely hanging a wide range of objects weighing up to 200 lbs. to the wall with relative ease.

The mounting device does not require wall studs. It does not require any other external supporting means to hang heavy objects on the wall.

The mounting device can support the weight of a wide range of objects on different types of wall structures, including dry walls and concrete walls.

Any user with little to no installation experience with a hammer and a screwdriver can easily install a wide range of objects including heavy objects like televisions or monitors with relative ease and in a short amount of time.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly:

FIGS. 10A-C-FIGS. 10A-C illustrate a method for mounting an object securely on a wall using a mounting device according to various embodiments of the present invention.

Like reference numerals refer to like parts throughout the several views of the drawings.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion.

Nevertheless, the specification and claims should be read with the understanding that such combinations are entirely within the scope of the invention and the claims. A mounting device to securely hang a wide range of objects to a wall is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below. The present invention will now be described by referencing the appended figures representing preferred embodiments.

Figure 1:
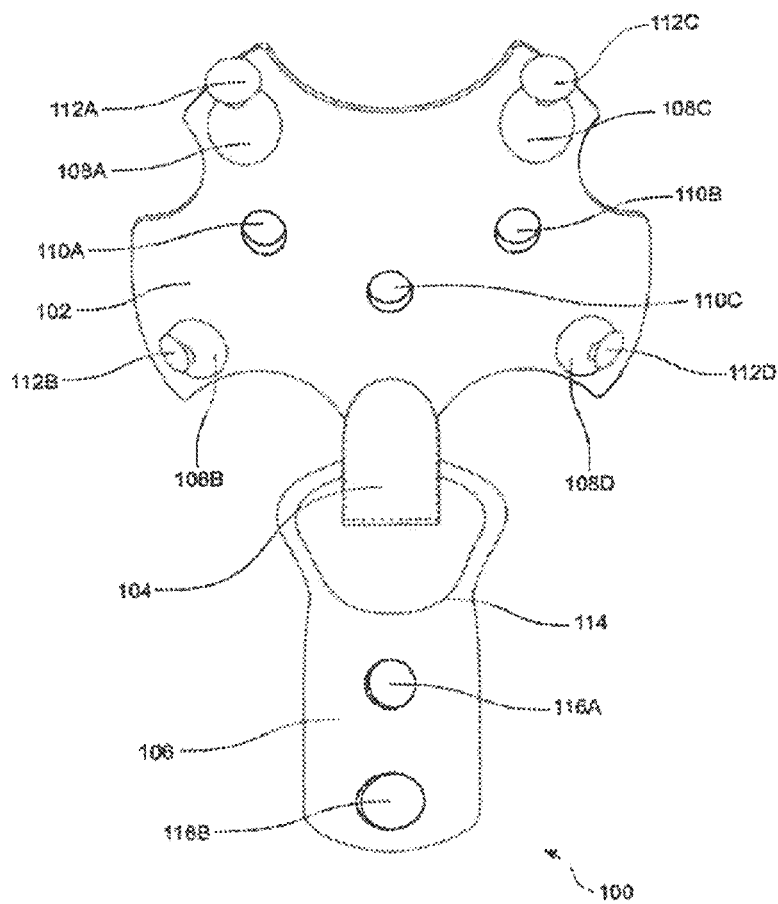
FIG. 1-FIG. 1 illustrates a mounting device to securely hang a wide range of objects on a wall according to various embodiments of the present invention.

FIG. 1 illustrates a mounting device to securely hang a wide range of objects on a wall according to various embodiments of the present invention. The mounting device 100 includes a support member 102, a hook portion 104, a hang member 106, a plurality of nipple members 108A-D, a plurality of apertures 110A-C, a plurality of nail members 112A-D, a large opening 114, and two small apertures 116A-B.

FIG. 1 also illustrates the plurality of nipple members 108A-D are structured to allow the plurality of nail members 112A-D to penetrate through the plurality of nipple members 108A-D onto the wall at a desired angle. The angled position of each of the nipple members 108A-D on the support member 102 causes an angular penetration of the plurality of nail members 112A-D through the nipple members 108A-D onto the wall. This angular penetration of the plurality of nail members 112A-D or "toenailing" of the plurality of nail members 112A-D into the wall allows for stronger support. The angular penetration of the plurality of nail members 112A-D through the nipple members 108A-D causes the mounting device 100 to offset the weight of the object to be hung with a reversely proportional upward pressure caused by the angular position of the plurality of nail members 112A-D driven into the wall.

FIG. 1 further illustrates two nail members 112A and 112C penetrate the support member 102 at the upper portion through the nipple members 108A and 108C respectively at a particular angle vertically to secure the support member 102 and another two nail members 112B and 112D penetrate the support member 102 at the bottom portion through the nipple members 108B and 108D horizontally in a side angular orientation to lock the support member 102 in place facilitating the user to remove the object from the wall securely without the support member 102 moving upwards. The two nail members 112A and 112C on the upper portion of the support member 102 are parallel to each other upon the angular penetration through the nipple members 108A and 108C at a vertical orientation. The two nail members 112B and 112D on the lower portion of the support member 102 are in a crossing relation to each other upon the angular penetration through the nipple members 108B and 108D at a horizontal orientation.

FIG. 1 also illustrates the support member 102 has a plurality of apertures 110A-C. The plurality of apertures 110A-C are oriented in a "V-shaped" orientation on the support member 102. The plurality of apertures 110A-C are structured to accommodate larger sized screws. The larger sized screws may be used as an alternative when objects need to be hung on a much denser wall made of a material such as concrete. Once hammered through the plurality of apertures 110A-C, the larger sized screws secure the support member 102 to a denser surface, wherein other normal or thinner sized nails cannot readily penetrate. The plurality of apertures 110A-C allows the user to use larger screws for denser walls by hammering the larger screws through the plurality of apertures 110A-C to securely affix the support member 102 to a denser wall as opposed to a dry wall or other easily penetrable wall. The support member 102 holds the hook portion 104 which has an angled edge similar to a fishhook. The edge comprises a barb member 104E (seen e.g., in FIGS. 3, 7, and 9). The hook portion 104 includes a flat bottom surface 104D at a portion 104C connecting a first portion 104A and a second portion 104B of the hook portion 104, the flat bottom surface 104D is configured to accommodate higher weight of the object to be hung (seen e.g., in FIGS. 3 and 9). The hook portion 104 does not allow the object to be able to come in and out easily unless the user lifts the object towards themself and pushes toward the hook portion 104 in order to maneuver the object away.

FIG. 1 further illustrates the hang member 106 has an angular orientation that allows the hang member 106 to affix itself directly to the object to be hung as well as couple the hang member 106 to the support member 102. The user can affix the object to the hang member 106 by driving a screw through each of the smaller apertures 116A-B disposed on a handle portion of the hang member 106. In order to affix the hang member 106 to the object, the user drives a screw through at least one of the smaller apertures 116A-B found on the handle portion of the hang member 106 as well as the aperture found on the object. This allows for the coupling of the hang member 106 to the object itself. The large opening 114 disposed on a head portion of the hang member 106 couples with a hook portion 104 when the user latches the large opening 114 of the hang member 106 onto the hook portion 104. The large opening 114 of the hang member 106 is connected to the hook portion 104 to effectively secure and hang the object to the wall. The base of the support member 102 is designed in a matter that makes the item much stronger, thicker, and heavier to allow pressure. The support member 102 is made out of nylon material using an injected mold process. The hang member 106 is made out of steel coated with black powder. In some embodiments, the mounting device 100 includes two hang members for flat objects same as another hang member except the item is flat instead of angled. The hang member 106 may be also made at a wide angle to be able to be inserted securely into the support member 102.

Figure 2:
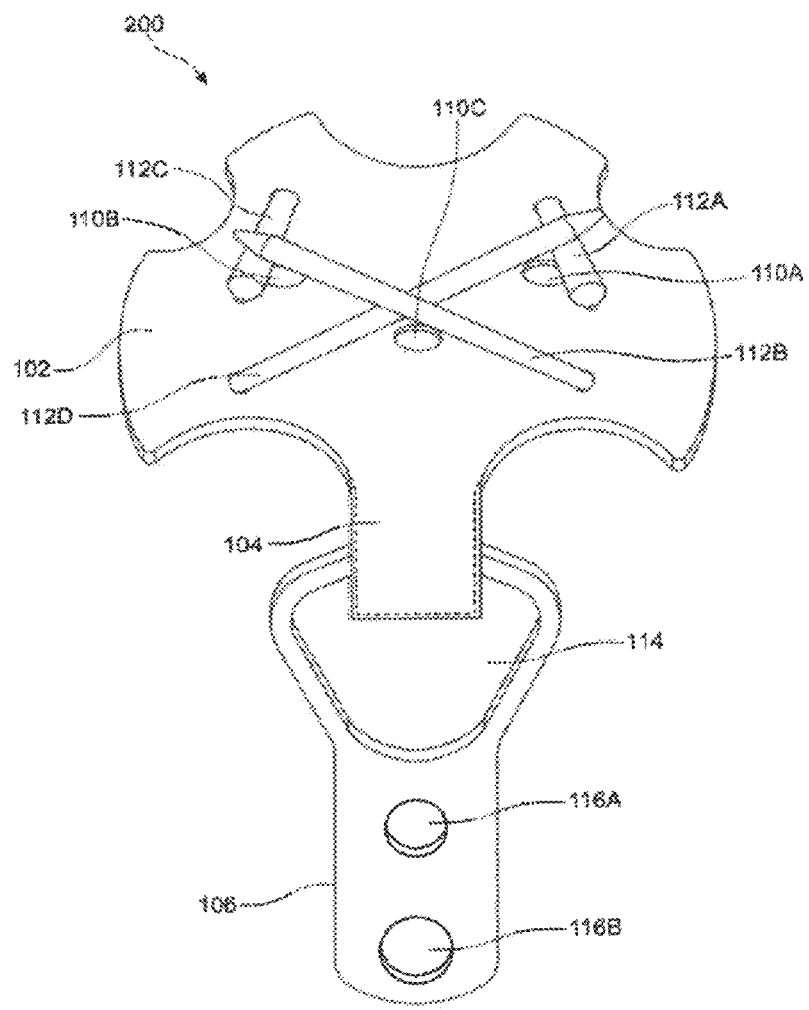
FIG. 2-FIG. 2 illustrates the back view of the mounting device of FIG. 1 according to various embodiments of the present invention.

FIG. 2 illustrates the back view of the mounting device of FIG. 1 according to various embodiments of the present invention. The back view 200 includes the support member 102, the hook portion 104, the hang member 106, the plurality of apertures 110A-C, the plurality of nail members 112A-D, the large opening 114, and two small apertures 116A-B. The functioning of the components has been described above.

Figure 3:
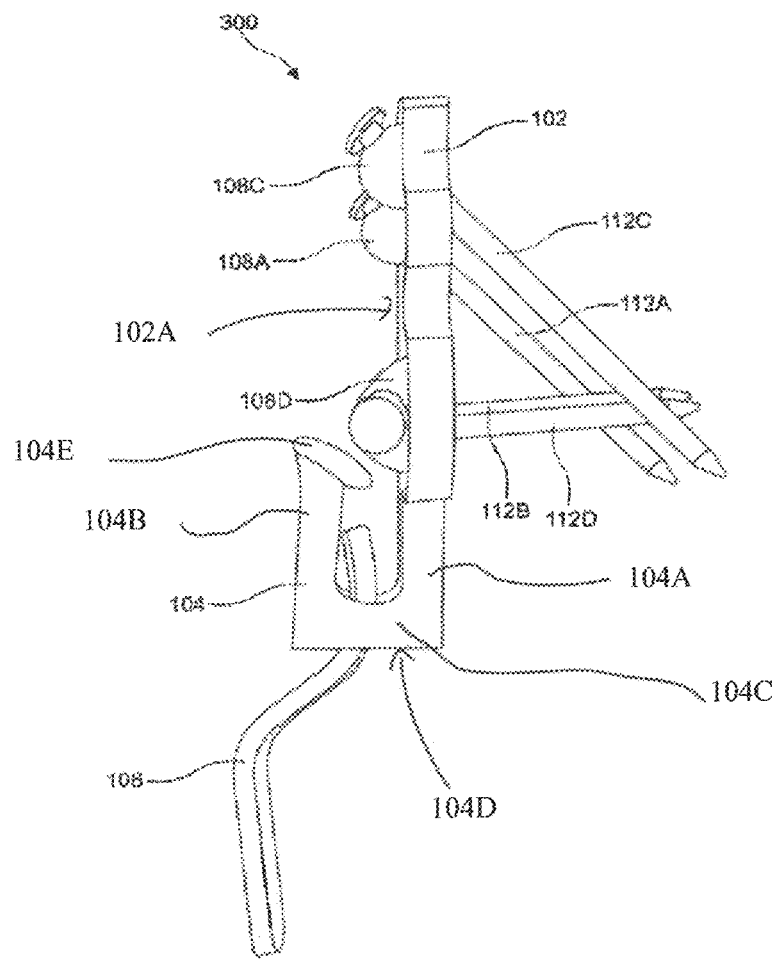
FIG. 3-FIG. 3 illustrates the side view of the mounting device of FIG. 1 according to various embodiments of the present invention.

FIG. 3 illustrates a side view of the mounting device of FIG. 1 according to various embodiments of the present invention. The side view 300 includes the support member 102, the hook portion 104, the hang member 106, the plurality of nipple members 108A, 108C, and 108D. and the plurality of nail members 112A-D. The functioning of the components has been described above.

Figure 4:
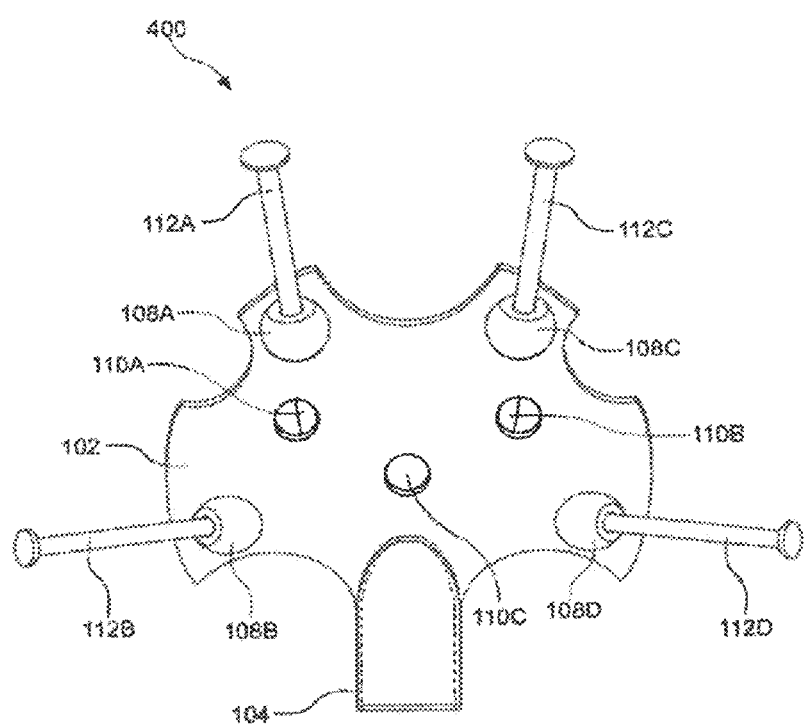
FIG. 4-FIG. 4 illustrates the mounting device of FIG. 1 without the hang member according to various embodiments of the present invention.

FIG. 4 illustrates the mounting device of FIG. 1 without the hang member according to various embodiments of the present invention. The mounting device without the hang member 400 includes the support member 102, the hook portion 104, the plurality of nipple members 108A-D, the plurality of apertures 110A-C and the plurality of nail members 112A-D. The functioning of the components has been described above.

Figure 5:
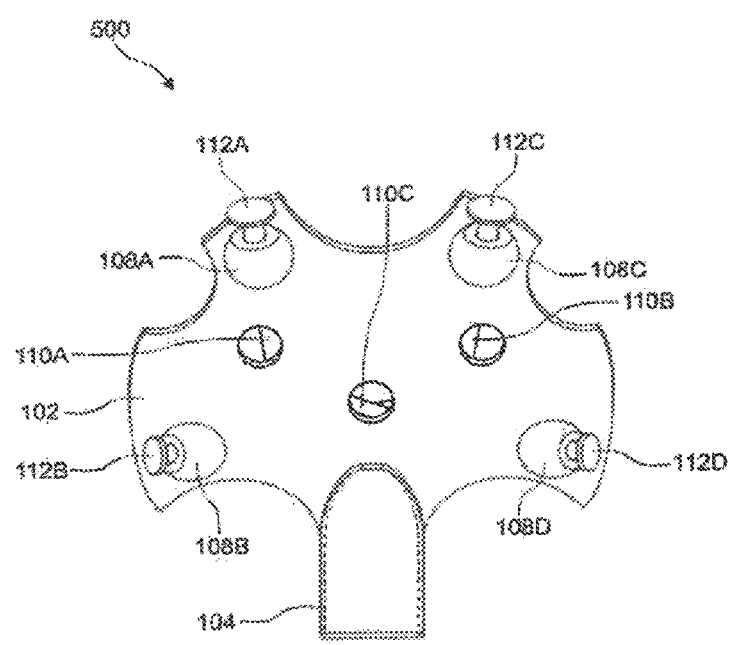
FIG. 5-FIG. 5 illustrates the front view of the mounting device of FIG. 1 without the hang member according to various embodiments of the present invention.

FIG. 5 illustrates the front view of the mounting device of FIG. 1 without the hang member according to various embodiments of the present invention. The front view 500 of the mounting device without the hang member includes the support member 102, the hook portion 104, the plurality of nipple members 108A-D, the plurality of apertures 110A-C and the plurality of nail members 112A-D. The functioning of the components has been described above.

Figure 6:
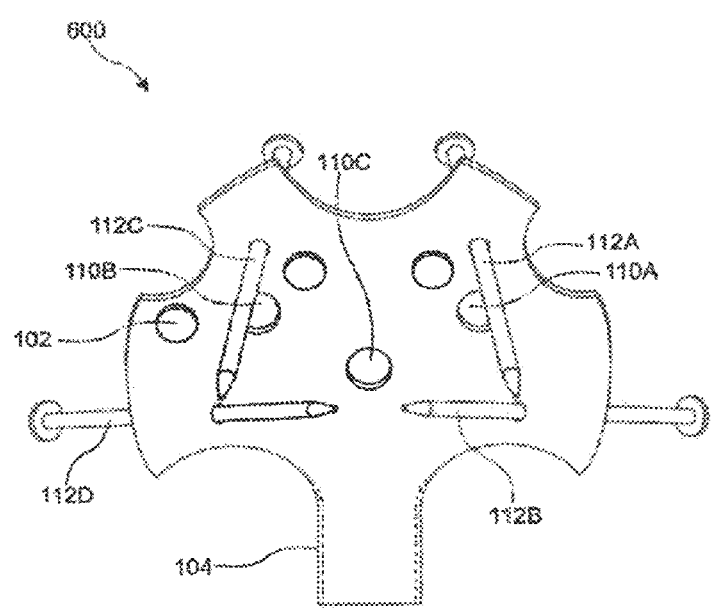
FIG. 6-FIG. 6 illustrates the back view of the mounting device of FIG. 1 without the hang member according to various embodiments of the present invention.

FIG. 6 illustrates the back view of the mounting device of FIG. 1 without the hang member according to various embodiments of the present invention. The back view 600 of the mounting device without the hang member includes the support member 102, the hook portion 104, the plurality of apertures 110A-C and the plurality of nail members 112A-D. The functioning of the components has been described above.

Figure 7:
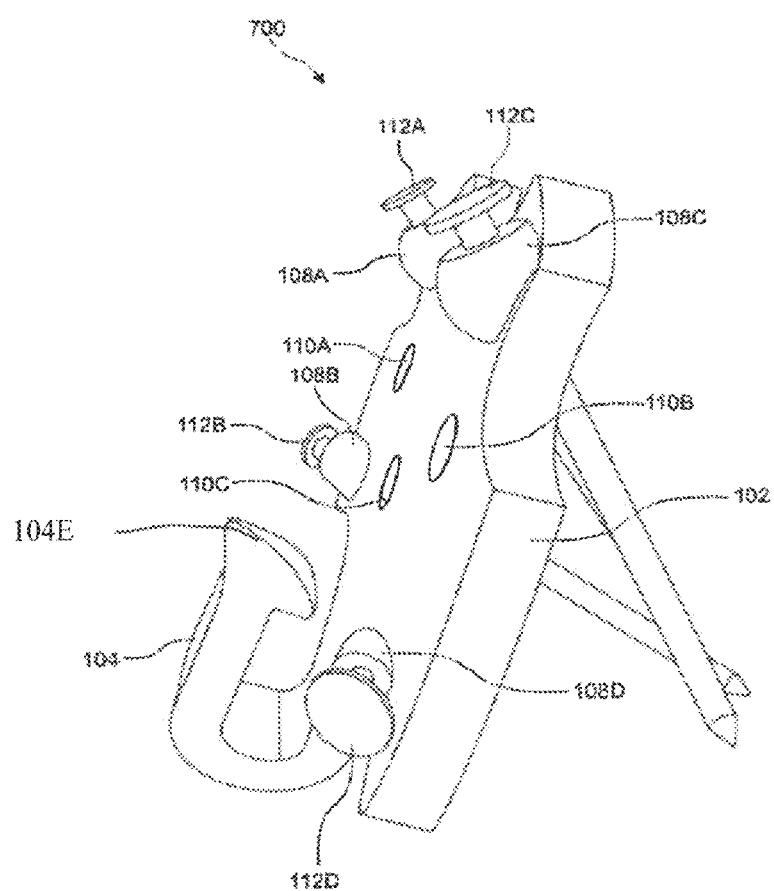
FIG. 7-FIG. 7 illustrates a side view of the mounting device of FIG. 1 without the hang member according to various embodiments of the present invention.

FIG. 7 illustrates a side view of the mounting device of FIG. 1 without the hang member according to various embodiments of the present invention. The side view 700 of the mounting device without the hang member includes the support member 102, the hook portion 104, the plurality of nipple members 108A-D, the plurality of apertures 110A-C and the plurality of nail members 112A-D. The functioning of the components has been described above.

Figure 8:
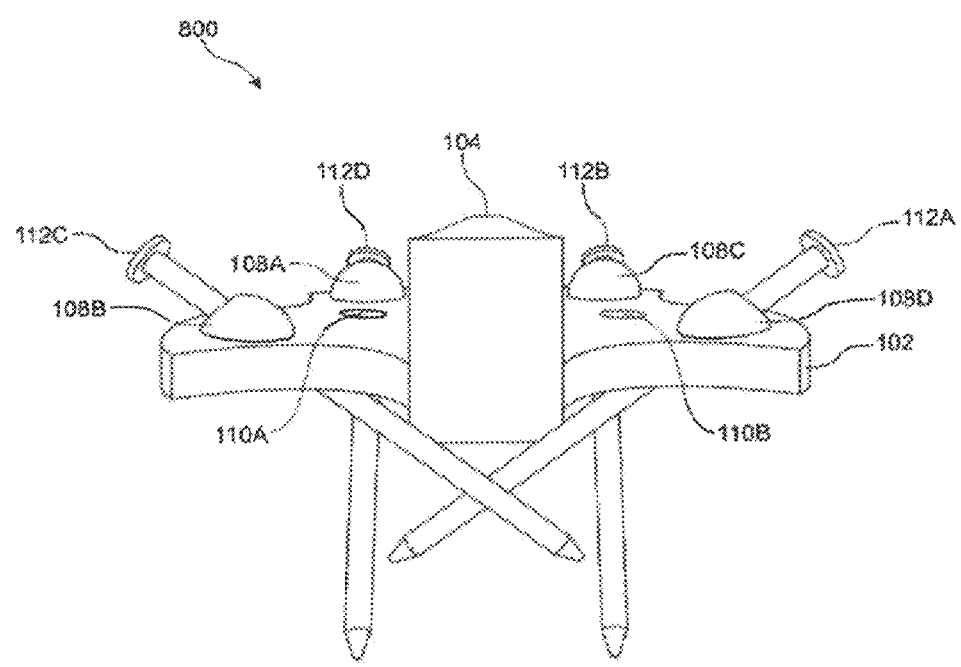
FIG. 8-FIG. 8 illustrates the bottom view of the mounting device of FIG. 1 without the hang member according to various embodiments of the present invention.

FIG. 8 illustrates the bottom view of the mounting device of FIG. 1 without the hang member according to various embodiments of the present invention. The bottom view 800 of the mounting device without the hang member includes the support member 102, the hook portion 104, the plurality of nipple members 108A-D, the plurality of apertures 110A and 110B and the plurality of nail members 112A-D. The functioning of the components has been described above.

Figure 9:
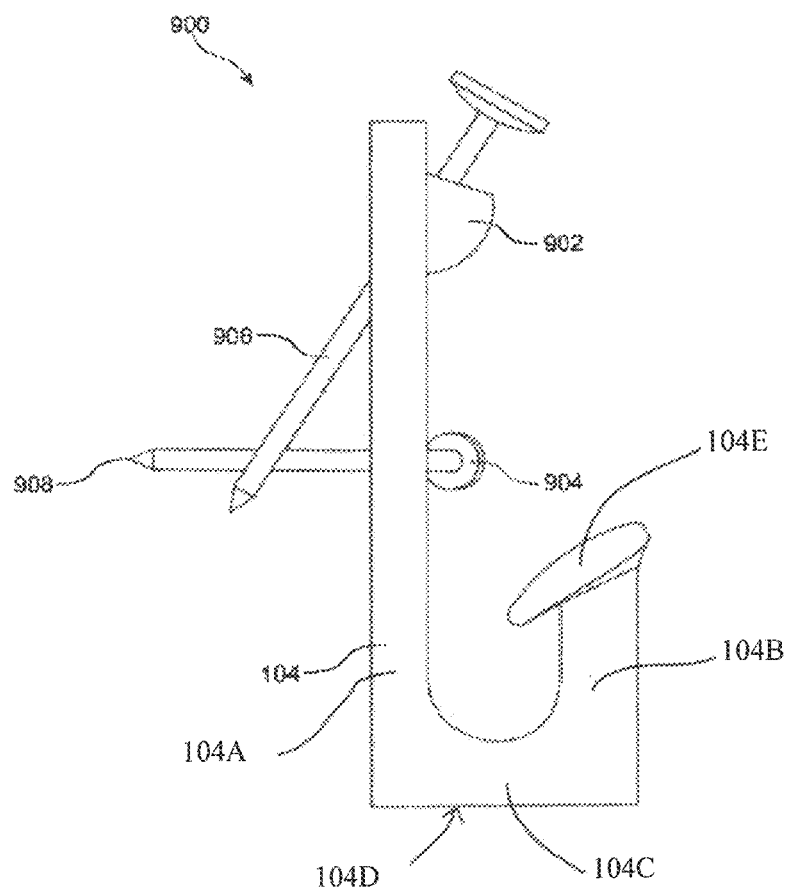
FIG. 9-FIG. 9 illustrates the hook portion of the mounting device of FIG. 1 according to various embodiments of the present invention.

FIG. 9 illustrates the hook portion of the mounting device of FIG. 1 according to various embodiments of the present invention. The hook portion 104 includes a flat bottom surface 104D at a portion 104C connecting a first portion 104A and a second portion 104B of the hook portion 104. The flat bottom surface 104D is configured to accommodate higher weight of the object to be hung. The hook portion 104 includes a first nipple member 902 and a second nipple member 904. The first nipple member 902 facilitates a first nail member 906 to penetrate at a particular angle vertically and the second nipple member 904 facilitates a second nail member 908 to penetrate horizontally at a side angular orientation.

Figure 10B:
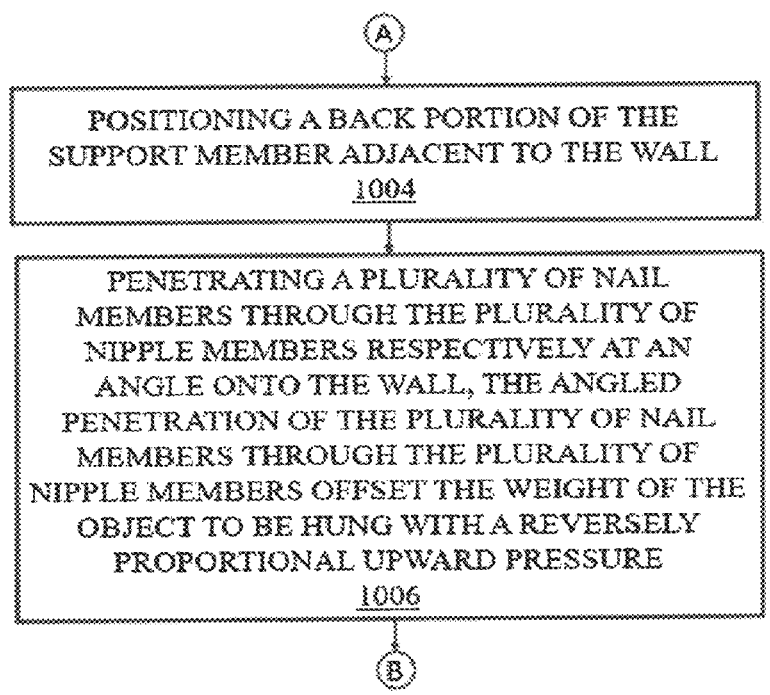

FIGS. 10A-C illustrate a method for mounting an object securely on a wall using a mounting device according to various embodiments of the present invention. At a step 1002, the method includes providing a mounting device comprising a support member with a hook portion and a hang member comprising a head portion and a handle portion. The support member comprises a plurality of nipple members provided in corners of an upper portion and a lower portion of the support member at an angled position and a plurality of apertures provided in a center portion of the support member. The head portion of the hang member comprises a large opening and the handle portion of the hang member comprises smaller apertures. At a step 1004, the method includes positioning a back portion of the support member adjacent to the wall. At a step 1006, the method includes penetrating a plurality of nail members through the plurality of nipple members respectively at an angle onto the wall. The angled penetration of the plurality of nail members through the plurality of nipple members offset the weight of the object to be hung with a reversely proportional upward pressure. At a step 1008, the method includes affixing the object to the hang member by driving screws through each of the smaller apertures disposed on the handle portion of the hang member. At a step 1010, the method includes coupling the hang member affixed with the object with the hook portion of the support member through the large opening provided on the head portion to securely mount the object on the wall.

While the present invention has been described in terms of particular embodiments and applications, in both summarized and detailed forms, it is not intended that these descriptions in any way limit its scope to any such embodiments and applications. It will be understood that many substitutions, changes and variations in the described embodiments, applications and details of the method and system illustrated herein and of their operation can be made by those skilled in the art without departing from the spirit of this invention.

What is claimed is:

1. A mounting device to securely hang an object to a wall, wherein the mounting device comprises:
    a support member provided with a hook portion, and
    a plurality of nail members,
    wherein the support member comprises a plurality of nipple members at an angled position,
    wherein the angled position of each of the nipple members on the support member facilitates an angular penetration of a plurality of nail members through the plurality of nipple members respectively onto the wall to offset weight of the object to be hung with a reversely proportional upward pressure,
    wherein the plurality of nipple members are configured to receive at least two of the plurality of nail members on an upper portion of the support member that are parallel to each other upon the angular penetration through the plurality of nipple members comprising at least two nipple members at a vertical orientation to secure the support member to the wall, wherein the plurality of nipple members are configured to receive at least two of the plurality of nail members on a lower portion of the support member that are in a crossing relation to each other upon the angular penetration through the plurality of nipple members comprising at least two nipple members at a horizontal orientation to lock the support member with the wall;

wherein the plurality of nipple members on the lower portion of the support member each define a hole at a shallow angle relative to a planar portion of the support member;

wherein the nail members on a lower portion of the support member have a sufficient length to overlap after being driven through to the plurality of nipple members comprising at least two nail members on a lower portion of the support member such that a head of each of the nail members contacts a respective one of the plurality of nipple members comprising at least two nail members on a lower portion of the support member; and a hang member comprising a head portion and a handle portion, wherein the head portion comprises a large opening to couple with the hook portion of the support member, wherein the handle portion comprises smaller apertures to affix the object to the hang member by driving screws through each of the smaller apertures, wherein the hook portion comprises:
    a flat bottom surface at a portion connecting a first portion and a second portion of the hook portion, wherein the flat bottom surface is configured to accommodate higher weight of the object to be hung; and
    an edge comprises a barb member configured at an acute angle relative to a mounting surface of the support member.

2. The mounting device of claim 1, wherein a plurality of apertures are provided in a center portion of the support member, wherein the plurality of apertures are positioned in a triangular orientation with each other and configured to accommodate larger-sized screws to facilitate affixing the support member on a denser wall, wherein the wall is a concrete wall.

3. The mounting device of claim 1, wherein the hook portion comprises a first nipple member and a second nipple member.

4. The mounting device of claim 3, wherein the first nipple member facilitates a first nail member to penetrate at a particular angle vertically and the second nipple member facilitates a second nail member to penetrate horizontally at a side angular orientation.

5. The mounting device of claim 1, wherein the mounting device comprises two hang members for hanging flat objects.

6. A mounting device to securely hang an object to a wall, wherein the mounting device comprises:
    a support member provided with a hook portion, and
    a plurality of nail members,
    wherein the support member comprises a plurality of nipple members provided in corners of an upper portion and a lower portion of the support member at an angled position,
    wherein the angled position of each of the nipple members on the support member facilitates an angular penetration of a plurality of nail members through the plurality of nipple members respectively onto the wall to offset weight of the object to be hung with a reversely proportional upward pressure and a plurality of apertures provided in a center portion of the support member,
    wherein the plurality of nipple members are configured to receive at least two of the plurality of nail members on an upper portion of the support member that are parallel to each other upon the angular penetration through the plurality of nipple members comprising at least two nipple members at a vertical orientation to secure the support member to the wall,
    wherein the plurality of nipple members are configured to receive at least two of the plurality of nail members on a lower portion of the support member that are in a crossing relation to each other upon the angular penetration through the plurality of nipple members comprising at least two nipple members at a horizontal orientation to lock the support member with the wall;
    wherein the plurality of nipple members on the lower portion of the support member each define a hole at a shallow angle relative to a planar portion of the support member;
    wherein the nail members on a lower portion of the support member have a sufficient length to overlap after being driven through to the plurality of nipple members comprising at least two nail members on a lower portion of the support member such that a head of each of the nail members contacts a respective one of the plurality of nipple members comprising at least two nail members on a lower portion of the support member; and
    a hang member comprising a head portion and a handle portion,
    wherein the head portion comprises a large opening to couple with the hook portion of the support member,
    wherein the handle portion comprises smaller apertures to affix the object to the hang member by driving screws through each of the smaller apertures,
    wherein the hook portion comprises:
        a flat bottom surface at a portion connecting a first portion and a second portion of the hook portion, wherein the flat bottom surface is configured to accommodate higher weight of the object to be hung; and
        an edge comprises a barb member configured at an acute angle relative to a mounting surface of the support member.

7. The mounting device of claim 6, wherein the plurality of apertures are positioned in a triangular orientation with each other and configured to accommodate larger-sized screws to facilitate affixing the support member on a denser wall, wherein the denser wall is a concrete wall.

8. The mounting device of claim 6, wherein the hook portion comprises a first nipple member and a second nipple member.

9. The mounting device of claim 8, wherein the first nipple member facilitates a first nail member to penetrate at a particular angle vertically and the second nipple member facilitates a second nail member to penetrate horizontally at a side angular orientation.

10. The mounting device of claim 6, wherein the mounting device comprises two hang members for hanging flat objects.

11. A method for mounting an object securely on a wall, wherein the method comprises:

providing a mounting device comprising a support member with a hook portion and a hang member comprising a head portion and a handle portion, wherein the support member comprises a plurality of nipple members provided in corners of an upper portion and a lower portion of the support member at an angled position and a plurality of apertures provided in a center portion of the support member, wherein the head portion of the hang member comprises a large opening and the handle portion of the hang member comprises smaller apertures;

positioning a back portion of the support member adjacent to the wall;

penetrating a plurality of nail members through the plurality of nipple members respectively at an angle onto the wall, wherein the angled penetration of the plurality of nail members through the plurality of nipple members offset the weight of the object to be hung with a reversely proportional upward pressure, wherein the plurality of nipple members are configured to receive at least two of the plurality of nail members on an upper portion of the support member are parallel to each other upon the angular penetration through the plurality of nipple members comprising at least two nipple members at a vertical orientation to secure the support member to the wall, wherein the plurality of nipple members are configured to receive at least two of the plurality of nail members on a lower portion of the support member are in a crossing relation to each other upon the angular penetration through the plurality of nipple members comprising at least two nipple members at a horizontal orientation to lock the support member with the wall;

wherein the plurality of nipple members on the lower portion of the support member each define a hole at a shallow angle relative to a planar portion of the support member;

wherein the nail members on a lower portion of the support member have a sufficient length to overlap after being driven through to the plurality of nipple members comprising at least two nail members on a lower portion of the support member such that a head of each of the nail members contacts a respective one of the plurality of nipple members comprising at least two nail members on a lower portion of the support member;

affixing the object to the hang member by driving screws through each of the smaller apertures disposed on the handle portion of the hang member; and coupling the hang member affixed with the object with the hook portion of the support member through the large opening provided on the head portion to securely mount the object on the wall, wherein the hook portion comprises:
- a flat bottom surface at a portion connecting a first portion and a second portion of the hook portion, wherein the flat bottom surface is configured to accommodate higher weight of the object to be hung; and
- an edge comprises a barb member configured at an acute angle relative to a mounting surface of the support member.

12. The method of claim 11, wherein the plurality of apertures are positioned in a triangular orientation with each other and configured to accommodate larger-sized screws to facilitate affixing the support member on a denser wall, wherein the denser wall is a concrete wall.

* * * * *